United States Patent [19]

Biresaw et al.

[11] Patent Number: 4,781,849

[45] Date of Patent: * Nov. 1, 1988

[54] LYOTROPIC LIQUID CRYSTAL METALWORKING LUBRICANT COMPOSITION

[75] Inventors: Girma Biresaw, Lower Burrell; Ronald P. Festa, New Kensington, both of Pa.

[73] Assignee: Aluminum Company of America, Pittsburgh, Pa.

[*] Notice: The portion of the term of this patent subsequent to Nov. 1, 2005 has been disclaimed.

[21] Appl. No.: 52,384

[22] Filed: May 21, 1987

[51] Int. Cl.$^4$ .......................................... C10M 173/00
[52] U.S. Cl. .................................................. 252/49.5
[58] Field of Search ...................................... 252/49.5

[56] References Cited

U.S. PATENT DOCUMENTS

| | | | |
|---|---|---|---|
| 2,606,874 | 8/1952 | Garner et al. | 252/308 |
| 3,296,129 | 1/1967 | Scheidker et al. | 252/49.5 |
| 3,649,538 | 3/1972 | Hatten | 252/49.5 |
| 3,928,215 | 12/1975 | Dreher et al. | 252/33.3 |
| 4,337,161 | 6/1982 | Stayner | 252/49.5 |
| 4,371,447 | 2/1983 | Webb et al. | 252/49.5 |
| 4,654,155 | 3/1987 | Kipp et al. | 252/32.5 |

OTHER PUBLICATIONS

"PTO Practice: 'Same Invention' Double Patenting", 69 JPOS 219–223, Examiner-in-Chief Alton D. Rollins.

Primary Examiner—William R. Dixon, Jr.
Assistant Examiner—Jerry D. Johnson
Attorney, Agent, or Firm—Glenn E. Klepac

[57] ABSTRACT

A metalworking lubricant comprising about 1–20 wt % natural or synthetic oil; about 0.5–30 wt % of a water-soluble surfactant, preferably a nonionic surfactant; about 1–20 wt % of an organic cosurfactant, preferably 1,2-octanediol; and about 50–97.5 wt % water containing less than about 1 wt % dissolved inorganic salts. The lubricant is preferably a lyotropic liquid crystal.

20 Claims, 2 Drawing Sheets

LYOTROPIC LIQUID CRYSTAL METALWORKING LUBRICANT COMPOSITION

PENDING RELATED APPLICATION

This application is related to co-pending application U.S. Ser. No. 52,385 filed May 21, 1987 for "Metalworking Lubricant Comprising an Oil-in-Water Microemulsion".

FIELD OF THE INVENTION

The present invention relates to a lubricant suitable for use in various metalworking operations. More specifically, the invention relates to a metalworking lubricant comprising a lyotropic liquid crystal.

BACKGROUND OF THE INVENTION

In the rolling of metals such as aluminum and aluminum alloys, it is customary to flood the rolls and the workpiece with a coolant in order to carry away heat generated by the operation. It is also customary to use as a coolant an emulsion comprising water, mineral oil, and various additives having load bearing and friction-modifying properties to reduce friction between the rolls and workpiece. In order to perform satisfactorily in industry, the lubricant fluid must meet several important requirements.

Among the requirements for a satisfactory metalworking lubricant are stability under operating conditions and corrosion-inhibiting properties. In addition, the lubricant should not cause metal deposits on the rolls and workpiece during the rolling operation. Other important requirements include avoidance of excessive foam formation and thermodynamic characteristics to ensure wetting both the roll and workpiece.

Lubricant emulsions containing water and mineral oil are known in the prior art. While such emulsions perform satisfactorily in achieving reduction of metal thickness, they are difficult to recycle for reuse. Removal of contaminants from used emulsion fluids requires separation of the oily and aqueous components. Such separation is expensive because it involves the addition of chemicals to break the emulsion followed by storage of the components in large settling tanks.

Liquid crystal lubricant compositions are seldom mentioned in the prior art. Dreher et al U.S. Pat. No. 3,928,215 discloses cutting oil compositions that are said to be like liquid crystals in that they exhibit birefringence. The compositions comprise a liquid hydrocarbon, water, an anionic surfactant and a cosurfactant which may be any of several different types of organic compounds. The cosurfactant is preferably an aliphatic alcohol and cyclohexanol is utilized in some examples. Dreher et al do not suggest using 1,2-alkanediols as cosurfactants.

Garner et al U.S. Pat. No. 2,606,874 discloses a water-in-oil emulsion readily dispersible in water and consisting essentially of mineral oil, water, a water-soluble anionic surfactant and a 1,2-alkanediol "coupling agent" which is preferably 1,2-octanediol. An electrolyte (6 wt % sodium sulfate) is dissolved in the water in all four examples. Garner et al do not mention liquid crystals and their ingredients are utilized in proportions which would be inconsistent with oil-in-water microemulsions.

It is a principal object of the present invention to provide a metalworking lubricant that is thermodynamically stable under operating conditions and readily separable into oily and aqueous components for ease in decontamination and recycling.

It is a related object of the present invention to provide a lubricant composition having satisfactory metalworking performance characteristics.

Another object of the invention is to provide an environmentally acceptable lubricant composition. A preferred composition containing 1,2-octanediol is much less toxic than prior art microemulsions containing short chain alcohols, which are extremely irritating.

Additional objectives and advantages of the invention will become apparent to persons skilled in the art upon reading the following detailed description of our invention.

SUMMARY OF THE INVENTION

The lubricant of the invention is suitable for use in metalworking and metal removal operations. Metalworking involves operations such as stamping, drawing, and hot and cold rolling. Metal removal involves operations such as grinding, tapping, broaching, and drilling. The lubricant is especially suitable for hot and cold rolling of aluminum and aluminum alloys into sheet and foil form.

The term "hot rolling" refers to rolling that takes place at a metal entry temperature of approximately 450°–1100° F. (232°–593° C.) for aluminum alloys. Metal entry temperature is usually about 600°–1000° F. (316°–538° C.). Hot rolling of ferrous alloys takes place atmetal entry temperatures up to about 2200° F. (1204° C.). Hot rolling is typically employed to reduce slabs of aluminum alloy material that are several inches thick into sheets having a thickness of about ⅛ inch (0.32 cm).

As used herein, the term "cold rolling" refers to rolling in which metal entry temperature ranges from ambient temperature to about 450° F. (232° C.) for aluminum alloys. Cold rolling is typically used to reduce sheets of aluminum alloy material about ⅛ inch (0.32 cm) thick into lesser thicknesses.

In accordance with the present invention, there is provided a lubricant composition comprising a lyotropic liquid crystal. As used herein, the term "lyotropic liquid crystal" refers to an anisotropic solution. Liquid crystals flow like liquids while at the same time being ordered like crystals. However, unlike solid crystals, liquid crystals have only one- or two-dimensional order.

The lubricant composition of the invention may also be a mixture of a lyotropic liquid crystal and an oil-in-water microemulsion. The term "oil-in-water microemulsion" refers to a clear, thermodynamically stable solution of oil in water. The oil is solubilized by a surfactant and a cosurfactant. In microemulsions, the average size of the oil droplets is approximately 50–800 angstroms whereas in emulsions, which are thermodynamically unstable, the average size is greater than about 0.1 micron. A microemulsion is sometimes called a "micellar emulsion".

The composition comprises about 1–20 wt % of a natural or synthetic oil, about 0.5–30 wt % of a water-soluble surfactant, about 1–20 wt % of an organic cosurfactant comprising a 1,2-alkanediol, and about 50–97.5 wt % water containing less than about 1 wt % dissolved inorganic salts.

The oil may be a natural or synthetic oil. Preferably, the oil is a refined mineral or synthetic oil having a viscosity of about 2–100 centistokes at 40° C. The oil is more preferably a branched chain synthetic oil. A particularly preferred branched chain synthetic oil is sold by Exxon Chemical Company under the trademark ISOPAR-M. When the composition is designed for cold rolling of aluminum and aluminum alloys, viscosity of the oil should be only about 2-5 centistokes at 40° C. For hot rolling, oil having a viscosity of about 20-110 centistokes at 40° C. is preferred.

Water constitutes about 50-97.5 wt % of the composition, preferably about 55-95 wt %, more preferably about 75-95 wt %. The water should contain less than about 1 wt % dissolved inorganic salts, preferably less than about 200 ppm dissolved salts. Distilled or deionized water having electrical conductivity less than about 400 mho-cm is particularly preferred.

The water contains about 0.5-30 wt % of a water-soluble surfactant, preferably about 1-15 wt % and more preferably about 2-6 wt %. The surfactant may be anionic, cationic, amphoteric, or nonionic with nonionic surfactants being preferred. A particularly preferred nonionic surfactant sold under the name "Lauryl Diethanolamide" comprises a mixture of $C_8$-$C_{18}$ diethanolamides.

Some other suitable nonionic surfactants include other fatty acid diethanolamides, ethoxylated fatty oils such as ethoxylated castor oil, and ethoxylated alkyl and dialkyl phenols wherein the alkyl groups have from 6 to 22 and preferably 8 to 12 carbon atoms. Such surfactants include, for example, polyethoxylated nonylphenols having about 6-13 ethoxyl groups. Some suitable anionic surfactants are sodium dodecylsulfate (sometimes referred to herein as "SDS"), synthetic sodium sulfonates including sodium dodecylbenzene sulfonate and sodium hexadecyl sulfonate, dipotassium isooctadecenyl succinate and sodium dioctyl sulfosuccinate.

A fourth ingredient of the composition is about 1-20 wt % of an organic cosurfactant comprising a $C_4$-$C_{12}$ 1,2-alkanediol. The cosurfactant preferably comprises about 3-15 wt % of the composition. Two preferred cosurfactants are 1,2-octanediol and 1,2-decanediol. Some other suitable 1,2-alkanediols are 1,2-heptanediol; 2,5-dimethyl-1,2-hexanediol; 2-methyl-1,2-octanediol; 2-methyl-1,2-nonanediol; 2-methyl-1,2-decanediol: 2-methyl-1,2-undecanediol and homologues of such compounds. Mixtures of two or more 1,2-alkanediols are also suitable. A particularly preferred composition utilizes 1,2-octanediol.

The preferred lubricant composition containing 1,2-octanediol as a cosurfactant is more environmentally acceptable than prior art microemulsions containing short chain alcohols. Compounds such as isopropanol and isobutanol can be extremely irritating to persons exposed to their vapors.

The composition may optionally contain a water-soluble alkanolamine. Some suitable alkanolamines are monoethanolamine, diethanolamine, triethanolamine, dimethylethanolamine, diethyl-ethanolamine, aminoethyl-ethanolamine, methyl-diethanolamine, N-acetyl ethanolamine, phenylethanolamine, phenyldiethanolamine, mono-, di-, and triisopropanolamine, and mixtures of any of the foregoing alkanolamines. Some preferred alkanolamines are triethanolamine, diethanolamine, and ethyl-diisopropanolamine. The alkanolamine generally constitutes about 0.4-3.5 wt % of the composition.

The composition may also include other additives that are desirable under certain conditions. Such additives include biocides, oxidation inhibitors, corrosion inhibitors, and antifoam agents.

DETAILED DESCRIPTION OF A PREFERRED EMBODIMENT

Figure 1:
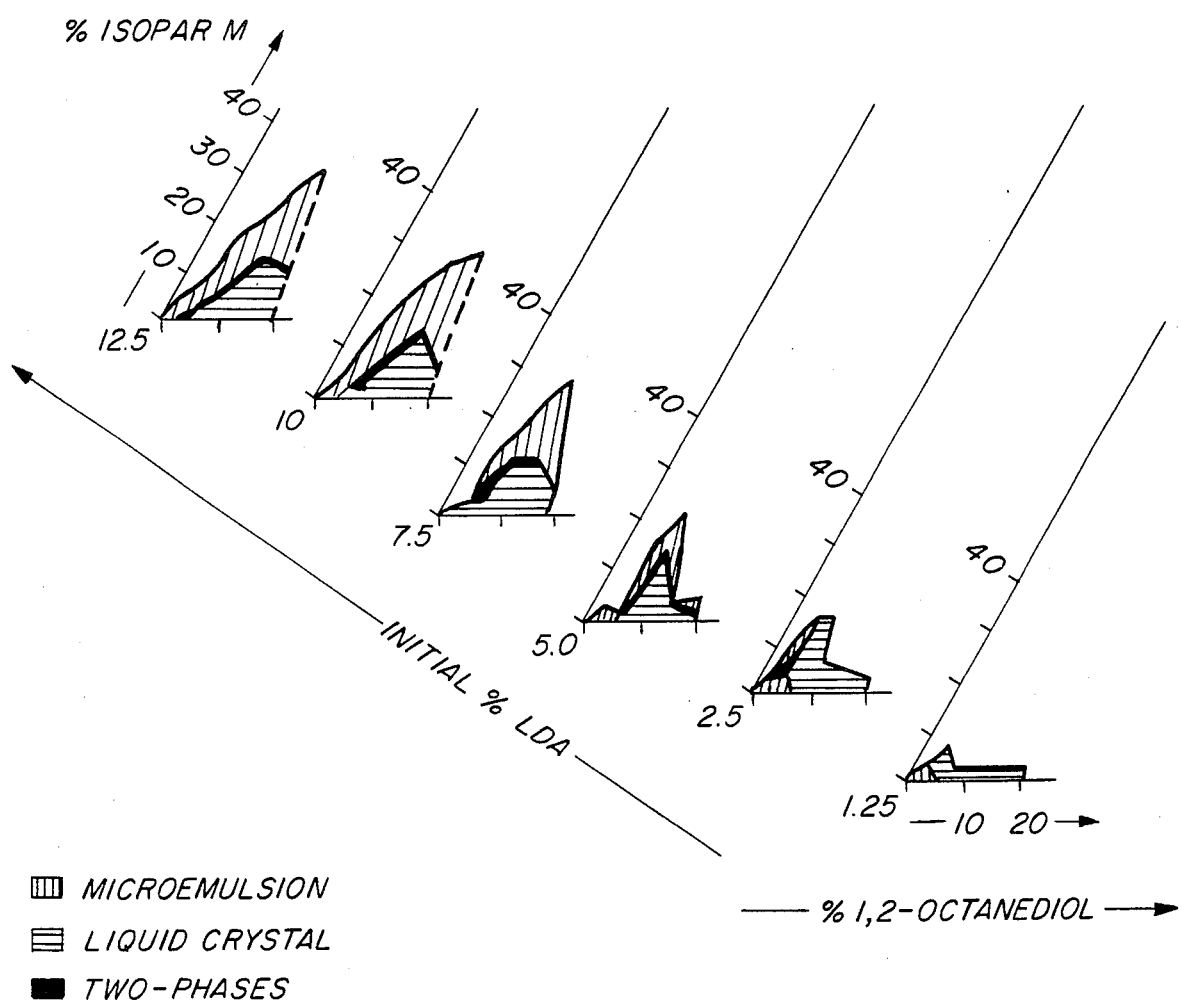
FIG. 1 is a series of partial pseudo-ternary phase diagrams for the system water-nonionic surfactant-octanediol-synthetic oil.
Figure 2:
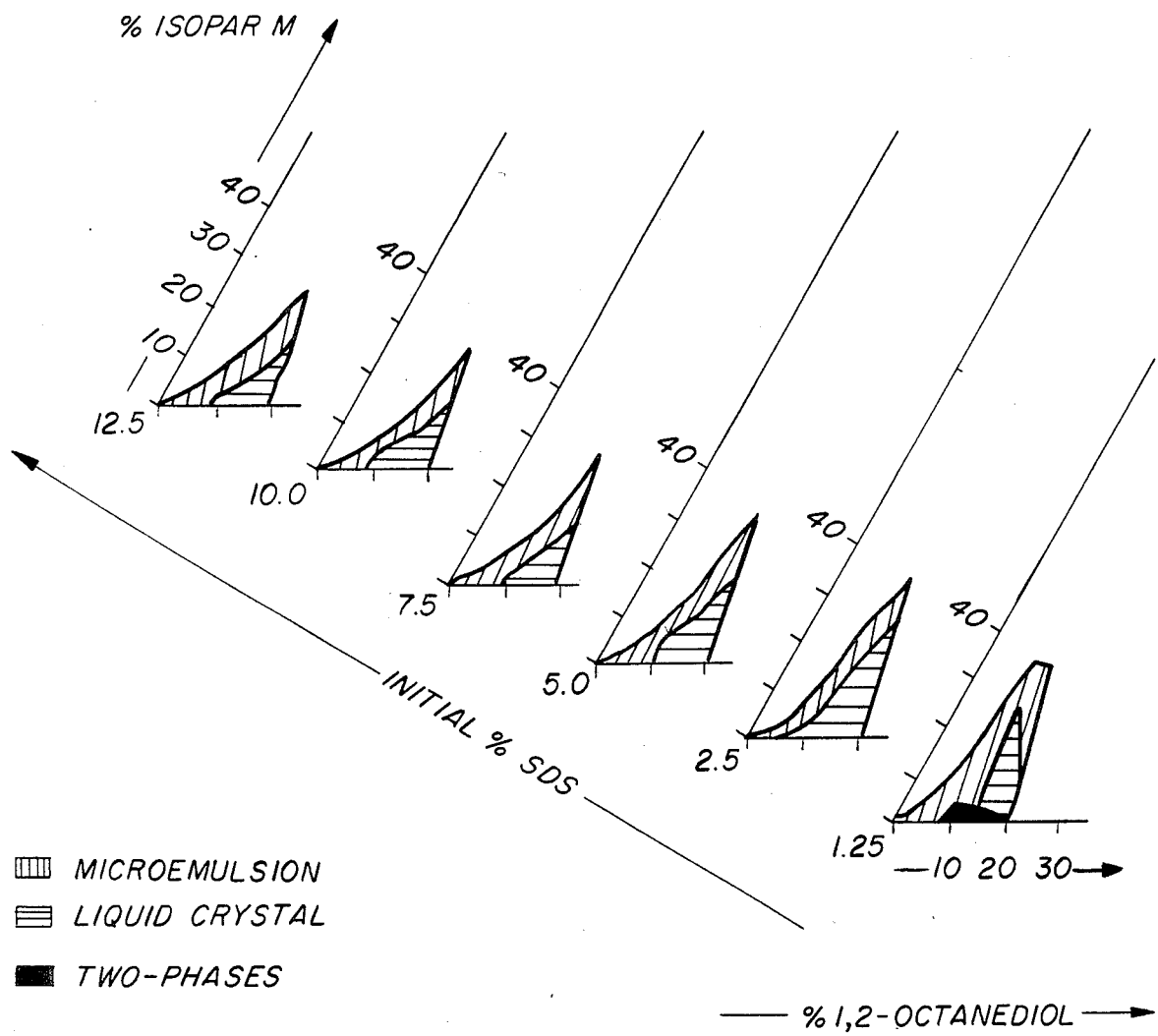
FIG. 2 is a series of pseudo-ternary phase diagrams for the system water-anionic surfactant-octanediol-synthetic oil.

Four-component phase diagrams were obtained to determine optimum concentrations of ingredients for the lubricant composition of the invention. FIG. 1 is a set of partial pseudo-ternary phase diarams for the system water-nonionic surfactant-octanediol-synthetic oil. As used herein, the term "pseudo-ternary phase diagram" refers to a partial phase diagram of a four-component system wherein the ratio of two components remains constant. In FIG. 1, the ratio of nonionic surfactant (LDA) to water was held constant. That ratio is indicated as a weight percentage of LDA ranging from 1.25 to 12.5. In FIG. 2, the ratio of the anionic surfactant (SDS) to water was held constant at various proportions ranging from 1.25 to 12.5 wt %.

As used herein, the term "LDA" refers to a nonionic surfactant sold by Phaltz & Bauer under the trade name "Lauryldiethanolamide, 90%". Actual analysis of LDA by gas chromatography and mass spectroscopy revealed the following ingredients:

| Component Class | Total Peak Area, % |
| --- | --- |
| $C_8$-$C_{18}$ fatty acid diethanolamides, mostly $C_{12}$ diethanolamide | 51.7 |
| Alkanolamines, mostly diethanolamine | 29.6 |
| Fatty acids, mostly lauric acid | 7.7 |
| Unidentified | 11.0 |
| Total | 100.0 |

Some particularly preferred lyotropic liquid crystal lubricant compositions were made up in accordance with the formulations shown in Table I. Each formulation contained deionized water; synthetic oil (branched chain polyolefin having a viscosity of about 2.17 centistokes at 40° C.); a nonionic surfactant (LDA) and 1,2-octanediol cosurfactant. The particularly preferred synthetic oil is sold by Exxon Chemical Company under the trademark ISOPAR M. Some formulations also contained triethanolamine (TEA). Kinematic viscosities at 25° C. and 40° C. are stated in centistokes.

Friction and wear tests were performed between steel rings and 5182 aluminum alloy blocks on an Alpha Model LFW-1 ring-on-block tester at a coolant temperature of 100° F. (38° C.). Maximum load forces were measured in pounds.

TABLE I

| | Formulation Number | | | | | | | |
|---|---|---|---|---|---|---|---|---|
| | 11-4 | 10-5 | 11-5 | 10-6 | 11-6 | 10-7 | 11-7 | 11-8 |
| Oil | 6 | 8 | 8 | 10 | 10 | 12 | 12 | 14 |
| Water | 84 | 82 | 82 | 80 | 80 | 78 | 78 | 76 |
| Octanediol | 7.50 | 6.75 | 7.50 | 6.75 | 7.50 | 6.75 | 7.00 | 7.50 |
| LDA | 2.50 | 2.50 | 2.50 | 2.50 | 2.50 | 2.50 | 2.50 | 2.50 |
| Triethanolamine | 0 | 0.75 | 0 | 0.75 | 0 | 0.75 | .50 | 0 |
| Viscosity, 25° C. | 66.3 | 18.97 | 15.83 | 6.79 | 9.59 | 8.25 | 9.81 | 6.08 |
| Viscosity, 40° C. | 5.13 | 10.84 | 4.40 | 6.86 | 3.55 | 6.30 | 4.60 | 5.30 |
| Maximum Load/COF Giving a Scar Rating of: | | | | | | | | |
| Smooth | 36/0.11 | 36/0.11 | 36/0.11 | 36/0.11 | 36/0.11 | 36/0.14 | 18/0.11 | 36/0.12 |
| Intermediate | — | — | 72/0.14 | — | 72/0.14 | 72/0.13 | — | — |
| Rough | 72/0.17 | 72/0.16 | 141/0.16 | 105/0.15 | 105/0.17 | 105/0.14 | 105/0.17 | 141/0.14 |

The viscosity data in Table I show that formulations containing higher oil concentrations generally have lower viscosities. Addition of triethanolamine generally reduced viscosity. Viscosities were generally higher at 25° C. than at 40° C.

The friction and wear data in Table I indicate that formulations containing higher oil concentrations generally show improved load-bearing capacity and slightly better friction properties than formulations with lower oil concentrations. Formulations 10-5, 11-6, and 11-7 changed to microemulsions upon completion of the tests. No reason for these changes is known.

While the invention has been described in terms of some preferred embodiments, the claims appended hereto are intended to encompass all embodiments which fall within the spirit of the invention.

What is claimed is:

1. A lubricant composition suitable for use as a metalworking lubricant and having the following ingredients:
   (a) about 1-20 wt % of a natural or synthetic oil,
   (b) about 0.5-30 wt % of a water-soluble surfactant,
   (c) about 1-20 wt % of an organic consurfactant comprising a $C_4$-$C_{12}$ 1,2-alkanediol, and
   (d) about 50-97.5 wt % water containing less than about 1 wt % dissolved inorganic salts; with the proviso that relative proportions of (a), (b), (c), and (d) are such that the composition comprises a lyotropic liquid crystal.

2. The composition of claim 2 wherein the electrical conductivity of said water is less than about 400 mho-cm.

3. The composition of claim 2 wherein said oil comprises a polyolefin synthetic oil.

4. The composition of claim 3 wherein said synthetic oil comprises predominantly a branched chain polyolefin.

5. The composition of claim 4 wherein the viscosity of said oil is about 2-100 centistokes at 40° C.

6. The composition of claim 1 wherein said surfactant comprises a nonionic surfactant.

7. The composition of claim 6 wherein said nonionic surfactant comprises a mixture of $C_8$-$C_{18}$ diethanolamides.

8. The composition of claim 1 wherein said cosurfactant comprises 1,2-octanediol.

9. The composition of claim 2 comprising:
   (a) about 5-20 wt % synthetic oil having a viscosity of about 2-100 centistokes at 40° C.,
   (b) about 1-15 wt % of a water-soluble nonionic surfactant,
   (c) about 3-15 wt % 1,2-octanediol, and
   (d) about 75-85 wt % water.

10. The composition of claim 9 further comprising:
    (e) about 0.4-3.5 wt % of a water-soluble alkanolamine.

11. The composition of claim 9 wherein said nonionic surfactant comprises a mixture of $C_8$-$C_{18}$ diethanolamides composition is defined by at least one of the liquid crystal regions shown in FIG. 1.

12. The composition of claim 1 wherein said surfactant is an anionic surfactant.

13. The composition of claim 12 wherein said anionic surfactant comprises sodium dodecylsulfate and said composition is defined by at least one of the liquid crystal regions shown in FIG. 2.

14. A method for metalworking comprising the steps of:
    (a) applying to a metal object a metalworking lubricant composition comprising about 1-20 wt % of a natural or synthetic oil, about 0.5-30 wt % of a water soluble surfactant, about 1-20 wt % of an organic cosurfactant comprising a $C_4$-$C_{12}$ 1,2-alkanediol and about 50-97.5 wt % water containing less than about 1 wt % dissolved inorganic salts, with the proviso that relative proportions of the oil, surfactant, cosurfactant, and water are such that the composition comprises a lyotropic liquid crystal, and
    (b) performing a metalworking operation on the object.

15. The method of claim 14 wherein said metal object comprises aluminum or an aluminum alloy.

16. The method of claim 14 wherein said metalworking operation comprises hot rolling or cold rolling the metal object.

17. The method of claim 14 wherein said metal object comprises aluminum or an aluminum alloy and said metalworking operation comprises cold rolling the object at about ambient temperature to 232° C.

18. The method of claim 14 wherein said composition further comprises about 0.4-3.5 wt % of a water-soluble alkanolamine.

19. The method of claim 14 wherein said cosurfactant comprises 1,2-octanediol.

20. The method of claim 14 wherein the electrical conductivity of said water is less than about 400 mho-cm.

* * * * *

UNITED STATES PATENT AND TRADEMARK OFFICE
CERTIFICATE OF CORRECTION

PATENT NO. : 4,781,849
DATED : November 1, 1988
INVENTOR(S) : Girma Biresaw, Ronald P. Festa It is certified that error appears in the above-identified patent and that said Letters Patent is hereby corrected as shown below:

| | |
|---|---|
| Under References Cited: | Change "Hatten" to --Hotten--. |
| Col. 4, line 22 | Change "diarams" to --diagrams--. |
| Claim 2, Col. 5, line 47 | Change "2" to --1--. |
| Claim 3, Col. 5, line 50 | Change "2" to --1--. |
| Claim 11, Col. 6, line 26 | After "diethanolamides" insert --and said--. |

Signed and Sealed this

Fourteenth Day of March, 1989

Attest:

DONALD J. QUIGG

Attesting Officer

Commissioner of Patents and Trademarks